US009278612B2

(12) United States Patent
Hayashi et al.

(10) Patent No.: US 9,278,612 B2
(45) Date of Patent: Mar. 8, 2016

(54) VEHICLE

(75) Inventors: Tsuyoshi Hayashi, Miyoshi (JP); Kenji Kimura, Miyoshi (JP); Takurou Nakayama, Okazaki (JP); Hirotaka Watanabe, Toyota (JP); Nobuyoshi Fujiwara, Toyota (JP); Akihiro Sato, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 198 days.

(21) Appl. No.: 14/238,851

(22) PCT Filed: Aug. 30, 2011

(86) PCT No.: PCT/JP2011/004836
§ 371 (c)(1),
(2), (4) Date: Feb. 14, 2014

(87) PCT Pub. No.: WO2013/030884
PCT Pub. Date: Mar. 7, 2013

(65) Prior Publication Data
US 2014/0196964 A1 Jul. 17, 2014

(51) Int. Cl.
*B60K 1/04* (2006.01)
*B60K 6/28* (2007.10)
(Continued)

(52) U.S. Cl.
CPC ... *B60K 1/04* (2013.01); *B60K 6/28* (2013.01); *H01M 10/625* (2015.04); *H01M 10/6563* (2015.04); *H01M 16/00* (2013.01); *B60K 11/06* (2013.01); *B60K 2001/005* (2013.01);
(Continued)

(58) Field of Classification Search
CPC .............. B60K 1/04; B60K 6/40; B60K 6/28; B60K 2001/005; B60K 11/06; B60K 2001/0438; B60K 2001/0416; H01M 2/10; Y10S 903/903
See application file for complete search history.

(56) References Cited

U.S. PATENT DOCUMENTS 6,390,215 B1 * 5/2002 Kodama et al. ............ 180/65.22
2004/0235315 A1 * 11/2004 Masui et al. .................... 439/34
(Continued)

FOREIGN PATENT DOCUMENTS

DE 102013003918 * 4/2014 ............... B60K 1/04
EP 1806248 A1 * 7/2007 ............... B60H 1/00
(Continued)

*Primary Examiner* — Paul N Dickson
*Assistant Examiner* — Bridget Avery
(74) *Attorney, Agent, or Firm* — Finnegan, Henderson, Farabow, Garrett & Dunner, LLP

(57) ABSTRACT

A vehicle has a motor and an engine each serving as a driving source for running the vehicle, and assembled batteries each capable of supplying an electric power to the motor. The assembled batteries include a high-power assembled battery and a high-capacity assembled battery. The high-power assembled battery is capable of charge and discharge with current relatively larger than that in the high-capacity assembled battery, and the high-capacity assembled battery has energy capacity relatively larger than that of the high-power assembled battery. In running of the vehicle using output from the motor with the engine stopped, the high-capacity assembled battery supplies more electric power to the motor than that in the high-power assembled battery. The high-power assembled battery is placed in a vehicle-inside space accommodating a passenger or baggage, and the high-capacity assembled battery is placed in a vehicle-outside space located on an outer face of a vehicle body.

9 Claims, 7 Drawing Sheets

(51) Int. Cl.
  *H01M 16/00*  (2006.01)
  *H01M 10/625*  (2014.01)
  *H01M 10/6563*  (2014.01)
  *B60K 11/06*  (2006.01)
  *B60K 1/00*  (2006.01)

(52) U.S. Cl.
  CPC . *B60K2001/0416* (2013.01); *B60K 2001/0438* (2013.01); *H01M 2220/20* (2013.01); *Y10S 903/903* (2013.01)

(56) References Cited

U.S. PATENT DOCUMENTS

| | | | |
|---|---|---|---|
| 2007/0137907 A1* | 6/2007 | Amori et al. | 180/65.1 |
| 2007/0154757 A1* | 7/2007 | Okazaki | 429/26 |
| 2007/0175623 A1* | 8/2007 | Park et al. | 165/202 |
| 2008/0245587 A1* | 10/2008 | Sastry et al. | 180/65.2 |
| 2009/0152034 A1 | 6/2009 | Takasaki et al. | |
| 2010/0071979 A1* | 3/2010 | Heichal et al. | 180/68.5 |
| 2011/0084658 A1 | 4/2011 | Yamamoto et al. | |
| 2011/0241859 A1* | 10/2011 | Handa | 340/438 |
| 2012/0097466 A1* | 4/2012 | Usami et al. | 180/68.5 |
| 2013/0020139 A1* | 1/2013 | Kim et al. | 180/68.5 |
| 2013/0078496 A1* | 3/2013 | Lim et al. | 429/120 |

FOREIGN PATENT DOCUMENTS

| | | |
|---|---|---|
| JP | 10-285800 | 10/1998 |
| JP | 2006-79987 | 3/2006 |
| JP | 2008-155830 | 7/2008 |
| JP | 2009-143446 | 7/2009 |
| JP | 2009-240094 | 10/2009 |
| JP | 2011-87457 | 4/2011 |

* cited by examiner

VEHICLE

CROSS-REFERENCE TO RELATED APPLICATIONS

This application is a national phase application of International Application No. PCT/JP2011/004836, filed Aug. 30, 2011, the content of which is incorporated herein by reference.

TECHNICAL FIELD

The present invention relates to a vehicle including a plurality of assembled batteries having different characteristics.

BACKGROUND ART

A battery system described in Patent Document 1 includes a high-capacity battery and a high-power battery which are connected in parallel to a load. The high-capacity battery has an energy capacity larger than that of the high-power battery. The high-power battery allows charge and discharge with a current larger than that in the high-capacity battery.

PRIOR ART DOCUMENT

Patent Document

[Patent Document 1] Japanese Patent Laid-Open No. 2006-079987

DISCLOSURE OF THE INVENTION

Problems to be Solved by the Invention

Patent Document 1 has disclosed a vehicle including the high-capacity battery and the high-power battery but has not made any disclosure of an arrangement of the high-capacity battery and the high-power battery. The high-capacity battery and the high-power battery may have different characteristics or may be used in different manners. The salability of the vehicle may be reduced unless the high-capacity battery and the high-power battery are mounted on the vehicle in view of the characteristics and the like of the high-capacity battery and the high-power battery.

Means for Solving the Problems

A vehicle according to the present invention has a motor and an engine each serving as a driving source for running the vehicle, and assembled batteries each capable of supplying an electric power to the motor. The assembled batteries include a high-power assembled battery and a high-capacity assembled battery which are constituted by secondary batteries, respectively. The high-power assembled battery is capable of charge and discharge with a current relatively larger than that in the high-capacity assembled battery, and the high-capacity assembled battery has an energy capacity relatively larger than that of the high-power assembled battery. In running of the vehicle using an output from the motor with the engine stopped, the high-capacity assembled battery supplies a more electric power to the motor than that in the high-power assembled battery. The high-power assembled battery is placed in a vehicle-inside space accommodating a passenger or baggage, and the high-capacity assembled battery is placed in a vehicle-outside space located on an outer face of a vehicle body.

In running of the vehicle using the output from the motor with the engine stopped, the operating sound of the assembled battery is heard by the passenger more easily than while the engine is driven. In running of the vehicle using the output from the motor with the engine stopped, since the high-capacity assembled battery supplies the more electric power to the motor than that in the high-power assembled battery, the operating sound of the high-capacity assembled battery is relatively louder than that of the high-power assembled battery. The high-capacity assembled battery is placed in the vehicle-outside space, so that the operating sound of the high-capacity assembled battery can hardly reach the vehicle-inside space (in other words, the passenger).

Electromagnetic waves are produced from the assembled battery during charge and discharge. The placement of the high-capacity assembled battery in the vehicle-outside space can prevent the electromagnetic waves from reaching the vehicle-inside space. Since the vehicle body is present between the vehicle-inside space and the vehicle-outside space, the electromagnetic waves directed from the high-capacity assembled battery toward the vehicle-inside space are blocked by the vehicle body. The prevention of the electromagnetic waves from reaching the vehicle-inside space can preclude the production of noise on a radio (sound) or a television (image and sound) used in the vehicle-inside space (especially, the space where the passenger rides).

The high-power assembled battery can achieve charge and discharge with the current larger than that of the high-capacity assembled battery and thus tends to produce more heat. Since the amount of heat production is proportional to the square of the value of the current, the high-power assembled battery having the value of the current higher than that of the high-capacity assembled battery tends to produce more heat. The temperature of the vehicle-inside space in which the high-power assembled battery is placed is often adjusted to a temperature suitable for the passenger and the battery. Since the high-power assembled battery is placed in the vehicle-inside space, air in the vehicle-inside space can be directed to the high-power assembled battery to suppress a rise in temperature of the high-power assembled battery due to the heat production and the like.

In running of the vehicle using the output from the motor with the engine stopped, the frequency of use of the high-capacity assembled battery is higher than the frequency of use of the high-power assembled battery. In running of the vehicle using the output from the motor with the engine stopped, the proportion of the electric power supplied from the high-capacity assembled battery to the motor in the electric power supplied to the motor is higher than the proportion of the electric power supplied from the high-power assembled battery to the motor. The preferential use of the high-capacity assembled battery can ensure the running distance of the vehicle.

The high-capacity assembled battery is replaced at a frequency higher than that of the high-power assembled battery. Since the high-capacity assembled battery has a higher temperature dependence than that of the high-power assembled battery, the high-capacity assembled battery may be deteriorated more than the high-power assembled battery in response to a temperature change. The continuous use of the high-capacity assembled battery at the frequency of use thereof higher than the frequency of use of the high-power assembled battery may deteriorate the high-capacity assembled battery more than the high-power assembled battery. Once the high-capacity assembled battery is deteriorated, the high-capacity assembled battery needs replacement. The high-capacity assembled battery is used to ensure the running distance of the vehicle described above, and the capacity of the high-capacity assembled battery can be changed to respond to the need of a user. In this case, the high-capacity assembled battery also needs replacement.

Since the high-capacity assembled battery is placed in the vehicle-outside space wider than the vehicle-inside space, the high-capacity assembled battery can be replaced readily. The vehicle-outside spade is accessed by an operator more easily than the vehicle-inside space, so that the replacement and inspection of the high-capacity assembled battery can be performed easily.

The high-capacity assembled battery can be charged by using an external power source. The external power source is a power source provided outside the vehicle and formed as a unit separate from the vehicle. For supplying an electric power of the external power source to the high-capacity assembled battery, a power-receiving portion and a power-transmitting portion can be used. The power-transmitting portion is connected to the external power source and wirelessly transmits the electric power from the external power source to the power-receiving portion. The power-receiving portion supplies the electric power from the power-transmitting portion to the high-capacity assembled battery.

The power-receiving portion needs to be provided on the outer face of the vehicle body in order to receive the electric power from the power-transmitting portion. Since the high-capacity assembled battery is placed in the vehicle-outside space, the power-receiving portion can be placed at a position adjacent to the high-capacity assembled battery. This can shorten the path for supplying the electric power from the power-receiving portion to the high-capacity assembled battery.

To ensure the running distance of the vehicle described above, the high-capacity assembled battery tends to have a size larger than that of the high-power assembled battery. The use of the vehicle-outside space wider than the vehicle-inside space can easily ensure the space in which the high-capacity assembled battery is placed. In changing the capacity of the high-capacity assembled battery, that is, the size of the high-capacity assembled battery, the use of the vehicle-outside space makes it possible to change the size of the high-capacity assembled battery smoothly.

To ensure the running distance of the vehicle described above, the high-capacity assembled battery tends to have a weight heavier than that of the high-power assembled battery. The barycenter of the vehicle can be lowered by attaching the high-capacity assembled battery to a surface of a floor panel (vehicle body) that faces outside the vehicle. This can suppress a roll of the vehicle to improve the drivability.

The high-power assembled battery can include a plurality of cells connected in series. The high-capacity assembled battery can include a plurality of cells connected in parallel. A square-type cell can be used as the cell of the high-power assembled battery, and a cylinder-type cell can be used as the cell of the high-capacity assembled battery.

MODE FOR CARRYING OUT THE INVENTION

An embodiment of the present invention will hereinafter be described.

[Embodiment 1]

Figure 1:
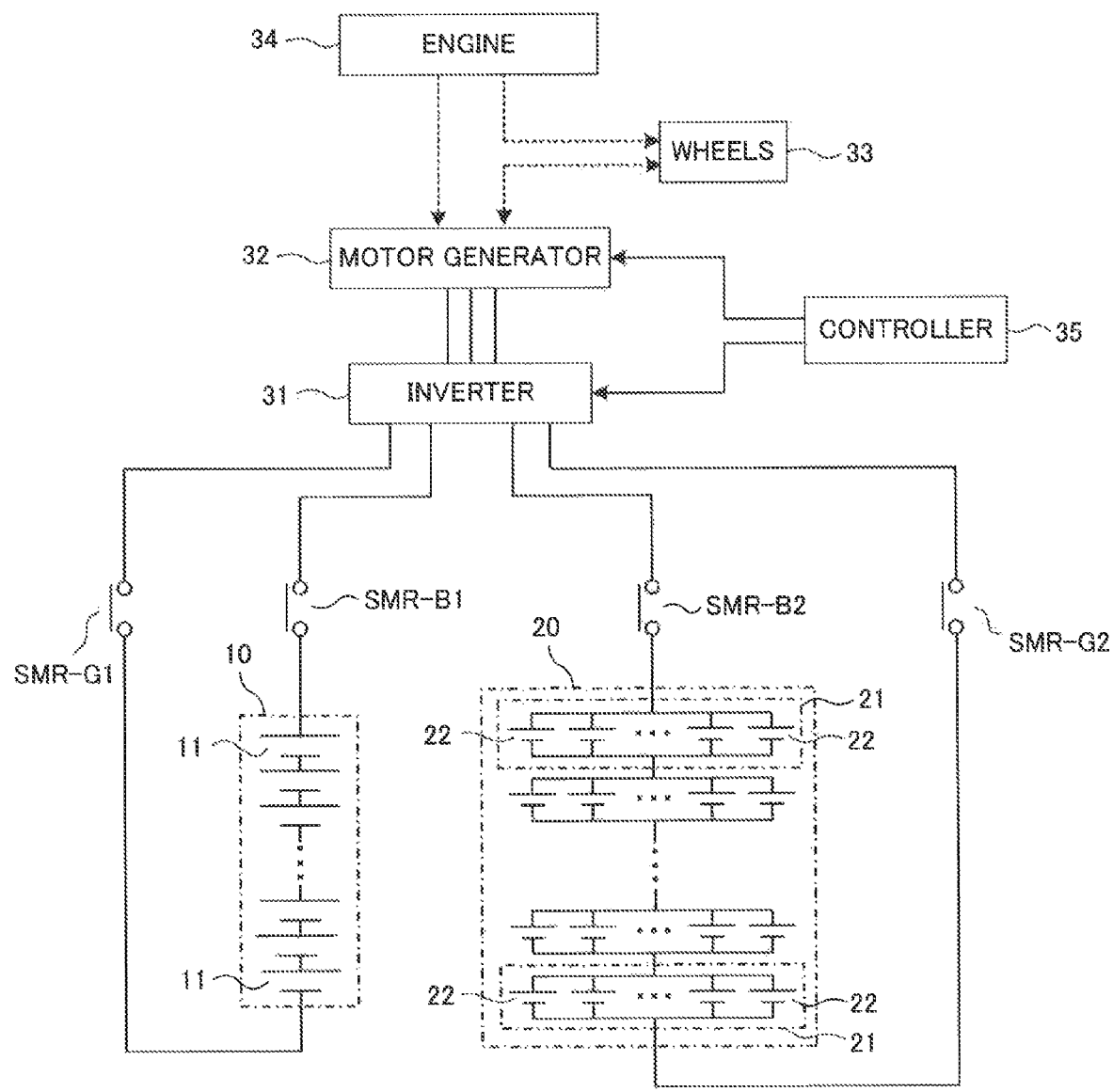
FIG. 1 is a diagram showing the configuration of a battery system.

A battery system according to the present embodiment is described with reference to FIG. 1. FIG. 1 is a schematic diagram showing the configuration of the battery system. The battery system according to the present embodiment is mounted on a vehicle. In FIG. 1, connections indicated by solid lines represent electrical connections, and connections indicated by dotted lines represent mechanical connections.

The battery system has a high-power assembled battery 10 and a high-capacity assembled battery 20 which are connected in parallel to each other. The high-power assembled battery 10 is connected to an inverter 31 through system main relays SMR-B1 and SMR-G1. The high-capacity assembled battery 20 is connected to the inverter 31 through system main relays SMR-B2 and SMR-G2. The inverter 31 converts a DC power supplied from each of the assembled batteries 10 and 20 into an AC power.

A motor generator 32 (AC motor) is connected to the inverter 31 and receives the AC power supplied from the inverter 31 to generate a kinetic energy for running the vehicle. The motor generator 32 is connected to wheels 33. An engine 34 is connected to the wheels 33, and a kinetic energy generated by the engine 34 is transferred to the wheels 33.

For decelerating or stopping the vehicle, the motor generator 32 converts a kinetic energy produced in braking the vehicle into an electric energy (AC power). The inverter 31 converts the AC power generated by the motor generator 32 into a DC power and supplies the DC power to the assembled batteries 10 and 20. This allows the assembled batteries 10 and 20 to store the regenerative power.

A controller 35 outputs a control signal to each of the inverter 31 and the motor generator 32 to control the driving thereof. The controller 35 also outputs a control signal to each of the system main relays SMR-B1 and B2, and SMR-G1 and G2 to make switching thereof between ON and OFF.

When the system main relays SMR-B1 and SMR-G1 are ON, charge and discharge of the high-power assembled battery 10 are allowed. When the system main relays SMR-B1 and SMR-G1 are OFF, the charge and discharge of the high-power assembled battery 10 are inhibited. When the system main relays SMR-B2 and SMR-G2 are ON, charge and discharge of the high-capacity assembled battery 20 are allowed.

When the system main relays SMR-B2 and SMR-G2 are OFF, the charge and discharge of the high-capacity assembled battery 20 are inhibited.

While the assembled batteries 10 and 20 are connected to the inverter 31 in the present embodiment, the present invention is not limited thereto. Specifically, a step-up circuit may be placed on the current path between the assembled batteries 10 and 20 and the inverter 31. This arrangement enables the step-up circuit to increase the voltage output from each of the assembled batteries 10 and 20.

The vehicle according to the present embodiment includes not only the assembled batteries 10 and 20 but also the engine 34 as the power source for running the vehicle. The engine 34 includes one which employs gasoline, a diesel fuel, or a biofuel.

The vehicle according to the present embodiment can be run by using only the output from the high-power assembled battery 10 and the output from the high-capacity assembled battery 20. This running mode is referred to as an EV (Electric Vehicle) mode. For example, the vehicle can be run by discharging the high-capacity assembled battery 20 from near 100% to near 0% SOC (State of Charge). After the SOC of the high-capacity assembled battery 20 reaches near 0%, an external power source can be used to charge the high-capacity assembled battery 20. A commercial power source can be used as the external power source, for example. When the commercial power source is used, a charger is required to convert an AC power into a DC power.

When a driver presses an accelerator pedal to increase the output required of the vehicle in the EV running mode, not only the output from the high-capacity assembled battery 20 but also the output from the high-power assembled battery 10 can be used to run the vehicle. The combinational use of the high-capacity assembled battery 20 and the high-power assembled battery 10 can ensure the battery output in accordance with the pressing of the accelerator pedal to improve the drivability.

After the SOC of the high-capacity assembled battery 20 reaches near 0%, the high-power assembled battery 10 and the engine 34 can be used in combination to run the vehicle. This running mode is referred to as an HV (Hybrid Vehicle) running mode. In the HV running mode, the charge and discharge of the high-power assembled battery 10 can be controlled such that the SOC of the high-power assembled battery 10 is changed on the basis of a predefined reference SOC, for example.

Specifically, when the SOC of the high-power assembled battery 10 is higher than the reference SOC, the high-power assembled battery 10 can be discharged to bring the SOC of the high-power assembled battery 10 closer to the reference SOC. Alternatively, when the SOC of the high-power assembled battery 10 is lower than the reference SOC, the high-power assembled battery 10 can be charged to bring the SOC of the high-power assembled battery 10 closer to the reference SOC. In the HV running mode, not only the high-power assembled battery 10 but also the high-capacity assembled battery 20 can be used. Specifically, the capacity of the high-capacity assembled battery 20 is reserved, and the high-capacity assembled battery 20 can be discharged in the HV running mode. In addition, the regenerative power may be stored in the high-capacity assembled battery 20.

As described above, the high-capacity assembled battery 20 can be used mainly in the EV running mode, and the high-power assembled battery 10 can be used mainly in the HV running mode. The main use of the high-capacity assembled battery 20 in the EV running mode means the following two cases. Firstly, it means that the frequency of use of the high-capacity assembled battery 20 is higher than that of the high-power assembled battery 10 in the EV running mode. Secondly, when the high-capacity assembled battery 20 and the high-power assembled battery 10 are used in combination in the EV running mode, the main use of the high-capacity assembled battery 20 means that the proportion of the electric power output therefrom in the total electric power used in running of the vehicle is higher than the proportion of the electric power output from the high-power assembled battery 10. The total electric power refers to an electric power used in a predetermined running time or a running distance, rather than a momentary electric power.

Figure 2:
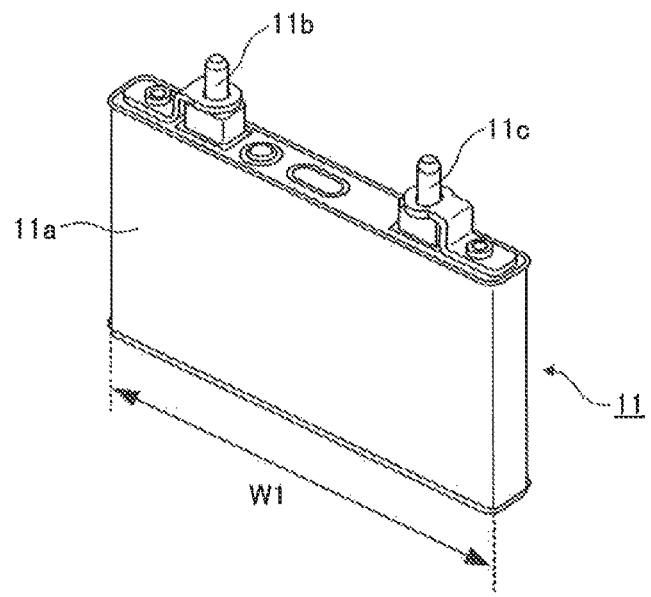
FIG. 2 is an external view of a cell used in a high-power assembled battery.

As shown in FIG. 1, the high-power assembled battery 10 has a plurality of cells 11 connected in series. A secondary battery such as a nickel metal hydride battery or a lithium-ion battery can be used as the cell 11. The number of the cells 11 constituting the high-power assembled battery 10 can be set as appropriate by taking account of the output required of the high-power assembled battery 10 and the like. As shown in FIG. 2, the cell 11 is a so-called square-type cell. The square-type cell refers to a cell having an outer shape conformed to a rectangle.

In FIG. 2, the cell 11 has a battery case 11a conformed to a rectangle. The battery case 11a accommodates a power-generating element performing charge and discharge. The power-generating element has a positive electrode component, a negative electrode component, and a separator placed between the positive electrode element and the negative electrode element. The separator contains an electrolytic solution. The positive electrode component has a collector plate and a positive electrode active material layer formed on a surface of the collector plate. The negative electrode component has a collector plate and a negative electrode active material layer formed on a surface of the collector plate.

A positive electrode terminal 11b and a negative electrode terminal 11c are placed on an upper face of the battery case 11a. The positive electrode terminal 11b is connected electrically to the positive electrode component of the power-generating element, and the negative electrode terminal 11c is connected electrically to the negative electrode component of the power-generating element.

Figure 3:
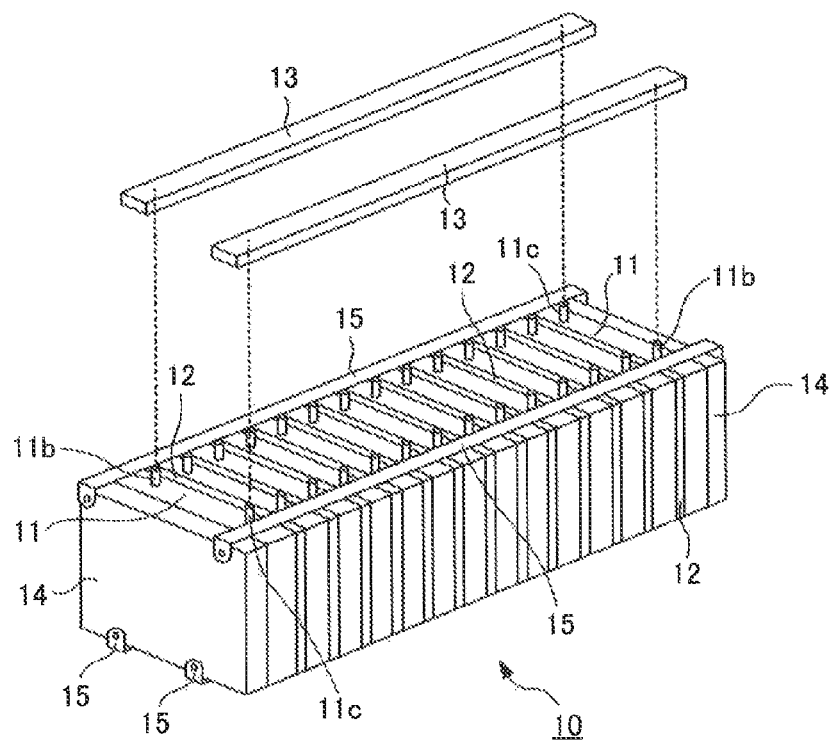
FIG. 3 is an external view of the high-power assembled battery.

As shown in FIG. 3, the high-power assembled battery 10 has the plurality of cells 11 placed side by side in one direction. A partitioning plate 12 is placed between adjacent two of the cells 11. The partitioning plate 12 can be made of an insulating material such as resin to ensure the insulating state between the two cells 11.

The use of the partitioning plate 12 can provide space on an outer face of the cell 11. Specifically, the partitioning plate 12 can have a protruding portion which protrudes toward the cell 11, and the end of the protruding portion can be brought into contact with the cell 11 to provide the space between the partitioning plate 12 and the cell 11. In this space, air used for adjusting the temperature of the cell 11 can be moved.

When the cell 11 generates heat due to charge and discharge or the like, air for cooling can be introduced into the space provided between the partitioning plate 12 and the cell 11. The air for cooling can exchange heat with the cell 11 to suppress a rise in temperature of the cell 11. Alternatively, when the cell 11 is excessively cooled, air for heating can be introduced into the space provided between the partitioning plate 12 and the cell 11. The air for heating can exchange heat with the cell 11 to suppress a drop in temperature of the cell 11.

The plurality of cells 11 are connected electrically in series through two bus bar modules 13. The bus bar module 13 has a plurality of bus bars and a holder for holding the plurality of bus bars. The bus bar is made of a conductive material and is connected to the positive electrode terminal $11b$ of one of two adjacent cells 11 and the negative electrode terminal $11c$ of the other cell 11. The holder is formed of an insulating material such as resin.

A pair of end plates is placed at both ends of the high-power assembled battery 10 in the direction in which the plurality of cells 11 are arranged. Restraint bands 15 extending in the direction of the arrangement of the plurality of cells 11 are connected to the pair of end plates 14. This can apply a restraint force to the plurality of cells 11. The restraint force refers to a force with which each of the cells 11 is held tightly in the direction of the arrangement of the plurality of cells 11. The restraint force applied to the cells 11 can suppress expansion of the cell 11 or the like.

In the present embodiment, two restraint bands 15 are placed on an upper face of the high-power assembled battery 10 and two restraint bands 15 are placed on a lower face of the high-power assembled battery 10. The number of the restraint bands 15 can be set as appropriate. It is only required that the use of the restraint bands 15 and the end plates 14 can apply the restraint force to the cells 11. Alternatively, the restraint force may not be applied to the cells 11, and the end plates 14 and the restraint bands 15 may be omitted.

While the plurality of cells 11 are arranged in one direction in the present embodiment, the present invention is not limited thereto. For example, a plurality of cells may be used to constitute a single battery module, and a plurality of such battery modules may be arranged in one direction.

As shown in FIG. 1, the high-capacity assembled battery 20 has a plurality of battery blocks 21 connected in series. Each of the battery blocks 21 has a plurality of cells 22 connected in parallel. The number of the battery blocks 21 and the number of the cells 22 included in each of the battery blocks 21 can be set as appropriate in view of the output required of the high-capacity assembled battery 20, the capacity thereof or the like. While the plurality of cells 22 are connected in parallel in the battery block 21 of the present embodiment, the present invention is not limited thereto. Specifically, a plurality of battery modules each including a plurality of cells 22 connected in series may be provided and connected in parallel to constitute the battery block 21.

Figure 4:
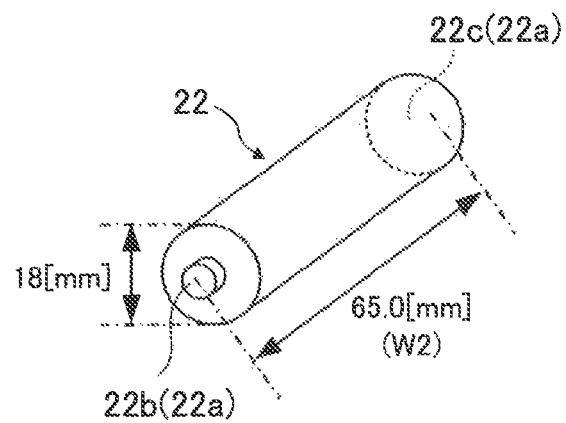
FIG. 4 is an external view of a cell used in a high-capacity assembled battery.

A secondary battery such as a nickel metal hydride battery or a lithium-ion battery can be used as the cell 22. As shown in FIG. 4, the cell 22 is a so-called cylinder-type cell. The cylinder-type cell refers to a cell having an outer shape conformed to a cylinder.

As shown in FIG. 4, the cylinder-type cell 22 has a cylindrical battery case $22a$. The battery case $22a$ accommodates a power-generating element. The power-generating element in the cell 22 has constituent members similar to the constituent members of the power-generating element in the cell 11.

A positive electrode terminal $22b$ and a negative electrode terminal $22c$ are provided at both ends of the cell 22 in a longitudinal direction. The positive electrode terminal $22b$ and the negative electrode terminal $22c$ form the battery case $22a$. The positive electrode terminal $22b$ is connected electrically to a positive electrode component of the power-generating element, and the negative electrode terminal $22c$ is connected electrically to a negative electrode component of the power-generating element. The cell 22 of the present embodiment is a battery called 18650 type having a diameter of 18 mm and a length of 65.0 mm. The cell 22 may be a cell having dimensions different from those of the 18650 type.

The size of the square-type cell 11 is larger than the size of the cylinder-type cell 22. The size of each of the cells 11 and 22 refers to the size of the portion thereof having the largest dimension. Specifically, in the configuration of the cell 11 shown in FIG. 2, a length W1 can be regarded as the size of the cell 11. In the configuration of the cell 22 shown in FIG. 4, a length W2 can be regarded as the size of the cell 22. The length W1 is larger than the length W2.

Figure 5:
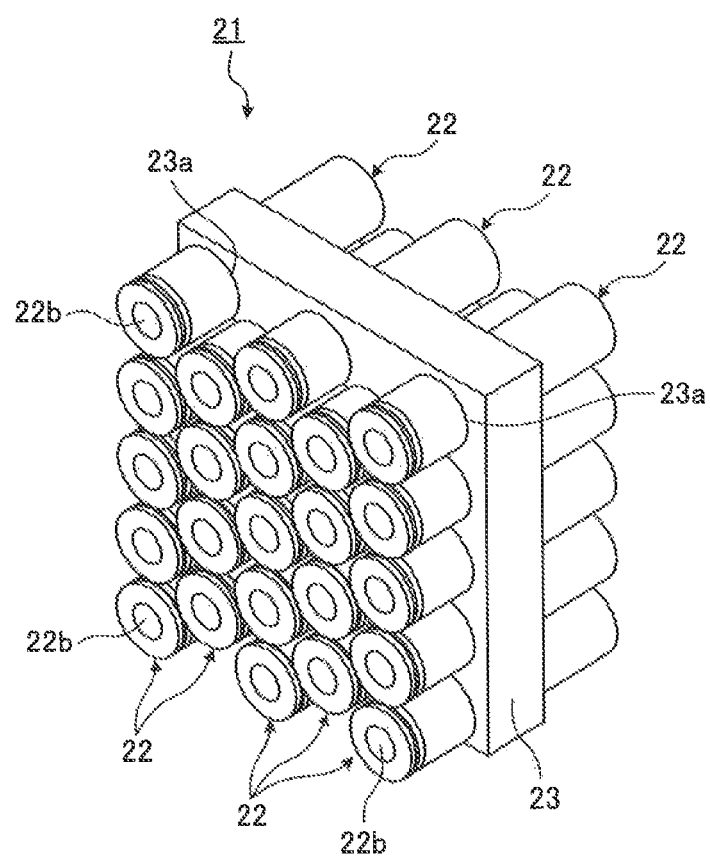
FIG. 5 is an external view of a battery block used in the high-capacity assembled battery.

As shown in FIG. 5, the battery block 21 has the plurality of cells 22 and a holder 23 which holds the plurality of cells 22. The plurality of battery blocks 21 are arranged in order to constitute the high-capacity assembled battery 20. The plurality of battery blocks 21 are connected in series through an electrical cable or the like. The high-capacity assembled battery 20 is used to ensure the running distance in the EV running mode, and the many cells 22 are used. Thus, the size of the high-capacity assembled battery 20 tends to be larger than the size of the high-power assembled battery 10.

The holder 23 has through holes $23a$ and each cell 22 is inserted into the through hole $23a$. The number of the through holes $23a$ provided is equal to the number of the cells 22. The plurality of cells 22 are placed such that the positive electrode terminals $22b$ (or the negative electrode terminals $22c$) are located on the same side of the holder 23. The plurality of positive electrode terminals $22b$ are connected to a single bus bar, and the plurality of negative electrode terminals $22c$ are connected to a single bus bar. This achieves the electrical parallel connection of the plurality of cells 22.

While the single holder 23 is used in the battery block 21 of the present embodiment, a plurality of holders 23 may be used. For example, one of the holders 23 can be used to hold the cells 22 on the side of the positive electrode terminals $22b$, and the other holder 23 can be used to hold the cells 22 on the side of the negative electrode terminals $22c$.

Next, description is made of the characteristics of the cell 11 used in the high-power assembled battery 10 and the characteristics of the cell 22 used in the high-capacity assembled battery 20. Table 1 shows the comparison between the characteristics of the cells 11 and 22. In Table 1, "high" and "low" represent the relative levels when the two cells 11 and 22 are compared. Specifically, "high" represents a higher level than that of the compared cell, and "low" represents a lower level than that of the compared cell.

TABLE 1

|  | cell 11 (high-power type) | cell 22 (high-capacity type) |
| --- | --- | --- |
| output density | high | low |
| power capacity density | low | high |
| dependence of input/output on temperature | low | high |
| dependence of battery life on temperature | low | high |

The cell 11 has an output density higher than that of the cell 22. The output density of each of the cells 11 and 22 can be represented as an electric power per unit mass of the cell (in W/kg) or an electric power per unit volume of the cell (in W/L). When the cells 11 and 22 have equal masses or volumes, the output (W) of the cell 11 is higher than the output (W) of the cell 22.

The output density in the electrode component (positive electrode component or negative electrode component) of each of the cells 11 and 22 can be represented as a current value per unit area of the electrode component (in mA/cm$^2$). The output density of the electrode component of the cell 11 is higher than that of the cell 22. When the electrode components have equal areas, the value of a current capable of passing through the electrode component of the cell 11 is higher than the value of a current capable of passing through the electrode component of the cell 22.

The cell 22 has an electric power capacity density higher than that of the cell 11. The electric power capacity density of each of the cells 11 and 22 can be represented as a capacity per unit mass of the cell (in Wh/kg) or a capacity per unit volume of the cell (in Wh/L). When the cells 11 and 22 have equal masses or volumes, the electric power capacity (Wh) of the cell 22 is higher than the electric power capacity (Wh) of the cell 11.

The capacity density in the electrode component of each of the cells 11 and 22 can be represented as a capacity per unit mass of the electrode component (in mAh/g) or a capacity per unit volume of the electrode component (in mAh/cc), for example. The capacity density of the electrode component of the cell 22 is higher than that of the cell 11. When the electrode components have equal masses or volumes, the capacity of the electrode component of the cell 22 is higher than the capacity of the electrode component of the cell 11.

Figure 6:
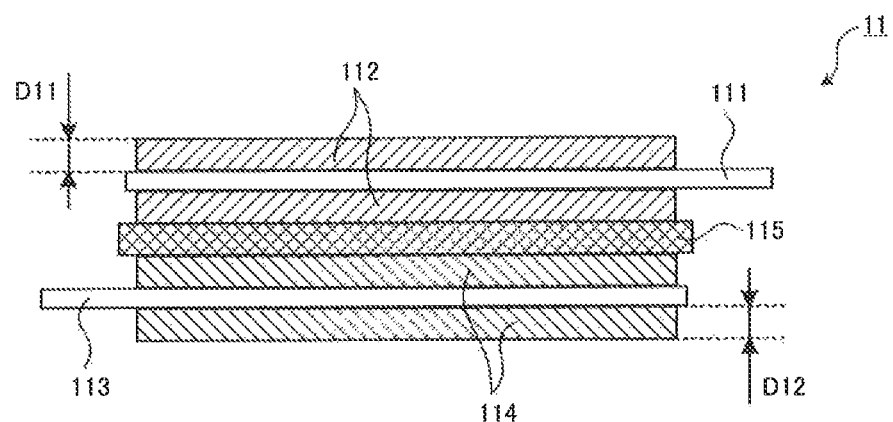
FIG. 6 is a diagram showing the configuration of a power-generating element used in the cell of the high-power assembled battery.
Figure 7:
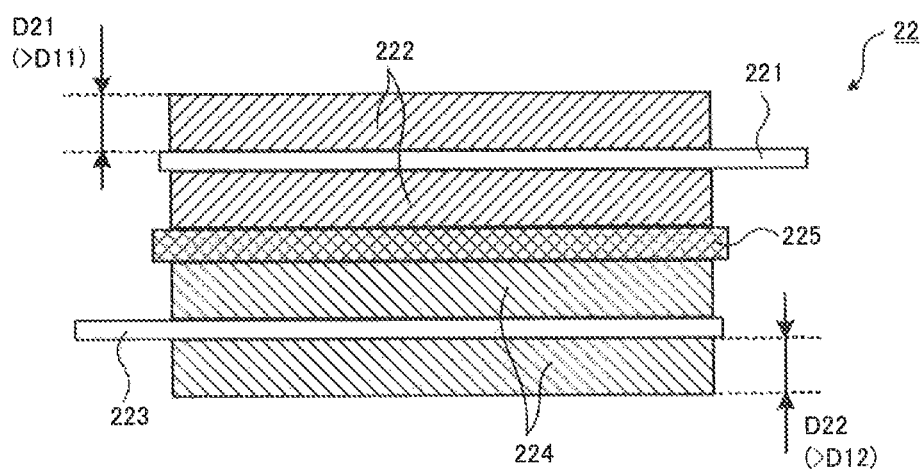
FIG. 7 is a diagram showing the configuration of a power-generating element used in a cell of the high-capacity assembled battery.

FIG. 6 is a schematic diagram showing the configuration of the power-generating element in the cell 11. FIG. 7 is a schematic diagram showing the configuration of the power-generating element in the cell 22.

In FIG. 6, the positive electrode component forming part of the power-generating element of the cell 11 has a collector plate 111 and an active material layer 112 formed on each face of the collector plate 111. When the cell 11 is a lithium-ion secondary battery, aluminum can be used as the material of the collector plate 111, for example. The active material layer 112 includes a positive electrode active material, a conductive material, a binder and the like.

The negative electrode component forming part of the power-generating element of the cell 11 has a collector plate 113 and an active material layer 114 formed on each face of the collector plate 113. When the cell 11 is a lithium-ion secondary battery, copper can be used as the material of the collector plate 113, for example. The active material layer 114 includes a negative electrode active material, a conductive material, a binder and the like.

A separator 115 is placed between the positive electrode component and the negative electrode component. The separator 115 is in contact with the active material layer 112 of the positive electrode component and the active material layer 114 of the negative electrode component. The positive electrode component, the separator 115, and the negative electrode component are layered in this order to constitute a laminate, and the laminate is wound, thereby making it possible to form the power-generating element.

While the active material layer 112 is formed on each face of the collector plate 111 and the active material layer 114 is formed on each face of the collector plate 113 in the present embodiment, the present invention is not limited thereto. Specifically, a so-called bipolar electrode can be used. The bipolar electrode has a positive electrode active material layer 112 formed on one face of a collector plate and a negative electrode active material layer 114 formed on the other face of the collector plate. A plurality of such bipolar electrodes are layered with separators interposed, so that the power-generating element can be formed.

In FIG. 7, the positive electrode component forming part of the power-generating element of the cell 22 has a collector plate 221 and an active material layer 222 formed on each face of the collector plate 221. When the cell 22 is a lithium-ion secondary battery, aluminum can be used as the material of the collector plate 221, for example. The active material layer 222 includes a positive electrode active material, a conductive material, a binder and the like.

The negative electrode component forming part of the power-generating element of the cell 22 has a collector plate 223 and an active material layer 224 formed on each face of the collector plate 223. When the cell 22 is a lithium-ion secondary battery, copper can be used as the material of the collector plate 223, for example. The active material layer 224 includes a negative electrode active material, a conductive material, a binder and the like. A separator 225 is placed between the positive electrode component and the negative electrode component. The separator 225 is in contact with the active material layer 222 of the positive electrode component and the active material layer 224 of the negative electrode component.

As shown in FIG. 6 and FIG. 7, a thickness D11 of the active material layer 112 is smaller than a thickness D21 of the active material layer 222 when the positive electrode components of the cell 11 and the cell 22 are compared. When the negative electrode components of the cell 11 and the cell 22 are compared, a thickness D12 of the active material layer 114 is smaller than a thickness D22 of the active material layer 224. The thicknesses D11 and D12 of the active material layers 112 and 114 smaller than the thicknesses D21 and D22 of the active material layers 222 and 224 can easily pass a current between the positive electrode component and the negative electrode component in the cell 11. Thus, the output density of the cell 11 is higher than the output density of the cell 22.

The volume per unit capacity (in cc/mAh) of the active material layer 112 is larger than that of the active material layer 222, and the volume per unit capacity of the active material layer 114 is larger than that of the active material layer 224. Since the thicknesses D21 and D22 of the active material layers 222 and 224 are larger than the thicknesses D11 and D12 of the active material layers 112 and 114, the capacity density of the cell 22 is higher than the capacity density of the cell 11.

Figure 8:
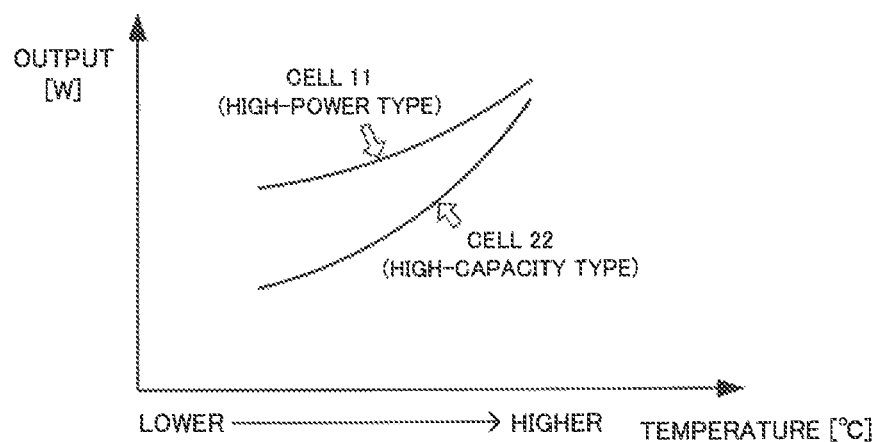
FIG. 8 is a graph showing the relationship between the output of the cell and temperature.

Next, description is made of the dependence of the battery on temperature. As shown in Table 1, the cell 22 has a higher dependence of input and output on temperature than that of the cell 11. Specifically, the input and output of the cell 22 are changed more easily than the input and output of the cell 11 in response to a temperature change. FIG. 8 shows the output characteristics of the cells 11 and 22 with respect to temperature. In FIG. 8, the horizontal axis represents the temperature and the vertical axis represents the output. While FIG. 8 shows the output characteristics of the cells 11 and 22, the input characteristics of the cells 11 and 22 have relationships similar to those shown in FIG. 8.

As shown in FIG. 8, the output performance of each of the cell (high-power type) 11 and the cell (high-capacity type) 22 is reduced as the temperature drops. The reduction rate of the output performance in the cell 11 is lower than the reduction rate of the output performance in the cell 22. In other words, the output performance of the cell 11 is less susceptible to the temperature than the output performance of the cell 22.

Figure 9:
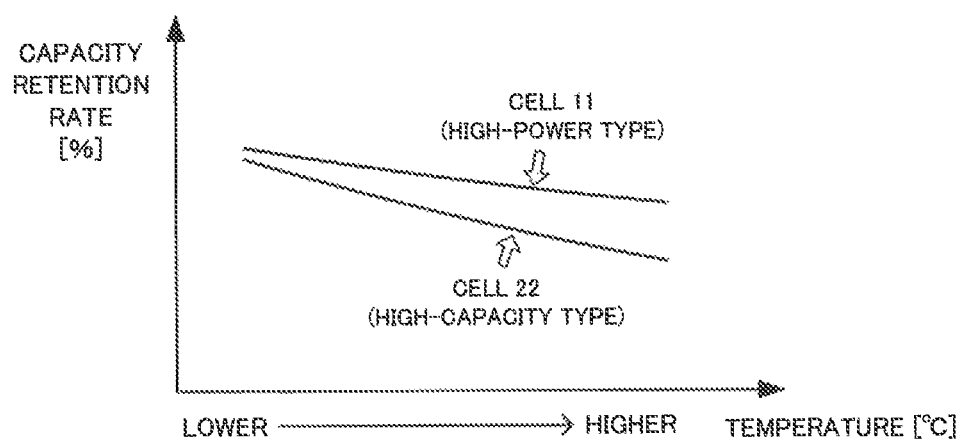
FIG. 9 is a graph showing the relationship between the capacity retention rate of the cell and temperature.

FIG. 9 is a graph showing the relationship between the capacity retention rate of each of the cells 11 and 22 and temperature. In FIG. 9, the horizontal axis represents the temperature and the vertical axis represents the capacity retention rate. The capacity retention rate is represented by the ratio between the capacity of each of the cells 11 and 22 in an initial state and the capacity of each of the cells 11 and 22 in a used state (deteriorated state) (deteriorated capacity/initial capacity). The initial state refers to the state immediately after each of the cells 11 and 22 is manufactured and before each of the cells 11 and 22 is used. The graph shown in FIG. 9 shows the capacity retention rates of the cells 11 and 22 after the cells are repeatedly charged and discharged at each temperature.

As shown in FIG. 9, the capacity retention rates of the cells 11 and 22 tend to be reduced as the temperature rises. The reductions in the capacity retention rate represent the deterioration of the cells 11 and 22. The reduction rate of the capacity retention rate of the cell 22 with respect to the temperature rise is higher than that of the cell 11. In other words, the cell 22 is deteriorated more readily than the cell 11 with respect to the temperature rise (temperature change). In this manner, the high-capacity assembled battery 20 has a higher dependence on temperature than that of the high-power assembled battery 10.

Figure 10:
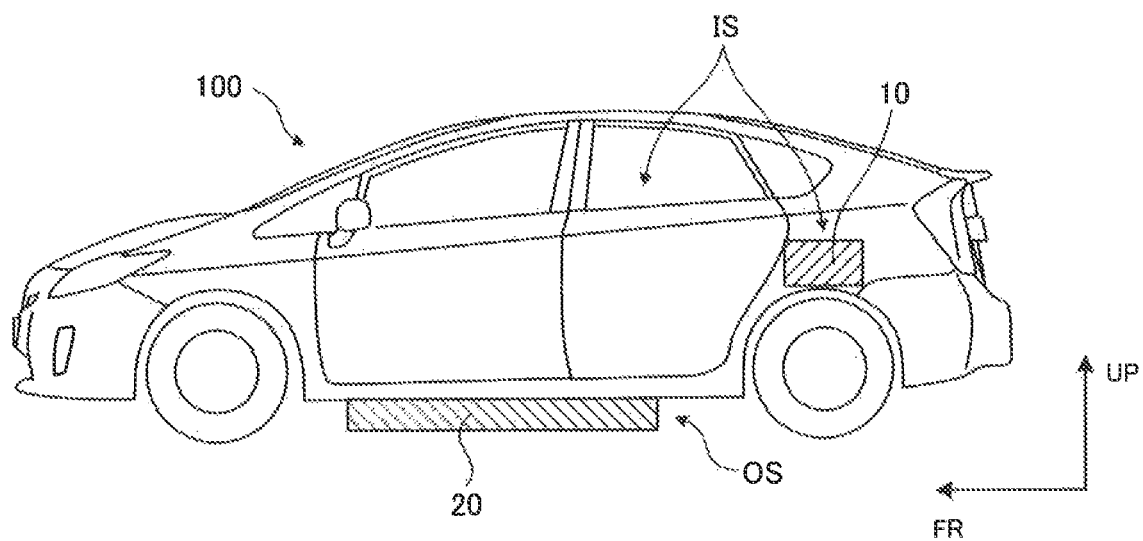
FIG. 10 is a schematic diagram of a vehicle on which the high-power assembled battery and the high-capacity assembled battery are mounted.

Next, description is made of the placement of the high-power assembled battery 10 and the high-capacity assembled battery 20 when they are mounted on the vehicle with reference to FIG. 10. In FIG. 10, a direction indicated by an arrow FR shows a forward direction of a vehicle 100, and a direction indicated by an arrow UP shows an upward direction of the vehicle 100.

In the present embodiment, the high-power assembled battery 10 is placed in a vehicle-inside space IS, and the high-capacity assembled battery 20 is placed a vehicle-outside space OS. The vehicle-inside space IS is space located inside the vehicle and accommodating passengers or baggage. The vehicle-inside space IS includes space where passengers ride (the interior of the vehicle) and space dedicated to the placement of baggage (so-called luggage space). The space where passengers ride is defined by the placement of seats. The vehicle 100 may be a vehicle in which the space where passengers ride is separated from the luggage space by a partitioning member or a vehicle in which the riding space communicates with the luggage space. The vehicle-outside space OS is space located outside the vehicle and extending along an outer face of a vehicle body.

In the present embodiment, the high-power assembled battery 10 is placed in the luggage space and the high-capacity assembled battery 20 is placed along a floor panel. The high-power assembled battery 10 is located above the high-capacity assembled battery 20 in the vehicle 100. The high-power assembled battery 10 can be placed not only in the luggage space but also in the space where passengers ride. Specifically, the high-power assembled battery 10 can be placed in space formed between a driver's seat and a passenger's seat or space formed below a seat cushion.

The floor panel may have a bend portion formed therein which protrudes upward in the vehicle 100. In other words, the bend portion is recessed when the floor panel is viewed from outside the vehicle 100. In this case, at least part of the high-capacity assembled battery 20 can be placed in the bend portion (so-called recess portion). This allows the high-capacity assembled battery 20 to be placed efficiently along the outer face of the vehicle 100 (floor panel). Alternatively, the high-capacity assembled battery 20 can be placed in an engine compartment, or the high-capacity assembled battery 20 can be attached to a ceiling of the vehicle body.

Figure 11:
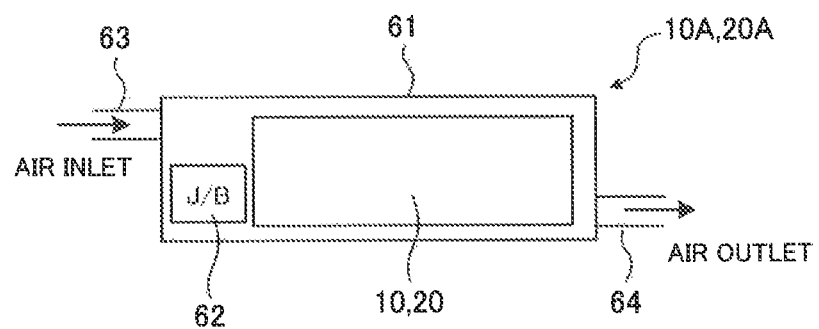
FIG. 11 is a schematic diagram showing the configuration of a battery pack.

In mounting the high-power assembled battery 10 and the high-capacity assembled battery 20 on the vehicle 100, the batteries 10 and 20 are mounted as battery packs 10A and 20A, respectively, on the vehicle 100 as shown in FIG. 11. The battery packs 10A and 20A each have a pack case 61 which accommodates the assembled batteries 10 and 20 and a junction box 62. The junction box 62 is placed at a position adjacent to the assembled batteries 10 and 20. The junction box 62 accommodates the system main relays SMR-B1 and B2, SMR-G1 and G2 (see FIG. 1) and the like.

An air inlet duct 63 and an air outlet duct 64 can be connected to each of the battery packs 10A and 20A. When a blower is placed for at least one of the air inlet duct 63 and the air outlet duct 64, the blower can be driven to supply the air for temperature adjustment to the assembled batteries 10 and 20. When the temperature of the assembled battery 10 or 20 rises, the air for cooling (cooled air) can be supplied to the assembled battery 10 or 20 to suppress a rise in temperature of the assembled battery 10 or 20. When the assembled battery 10 or 20 is excessively cooled, the air for heating (heated air) can be supplied to the assembled battery 10 or 20 to suppress a drop in temperature of the assembled battery 10 or 20.

Since the high-power assembled battery 10 is placed in the vehicle-inside space IS in the present embodiment, air present in the vehicle-inside space IS can be taken in through the air inlet duct 63 to adjust the temperature of the high-power assembled battery 10. Since the high-capacity assembled battery 20 is placed in the vehicle-outside space OS, air present in the vehicle-outside space OS can be taken in through the air inlet duct 63, for example, to adjust the temperature of the high-capacity assembled battery 20. The air present in the vehicle-inside space IS can also be supplied to the high-capacity assembled battery 20.

Figure 12:
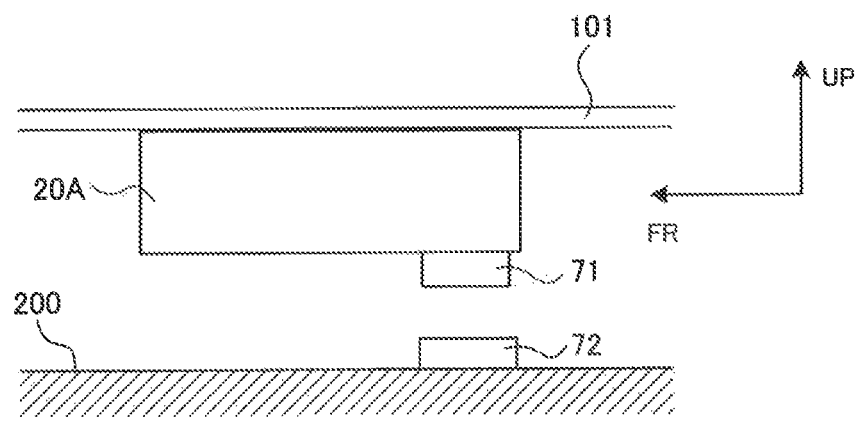
FIG. 12 is a schematic diagram showing a power supply system.

As shown in FIG. 12, a power-receiving portion 71 for receiving the electric power from an external power source is placed on the battery pack 20A of the high-capacity assembled battery 20. The battery pack 20A is fixed to the floor panel 101. The external power source is a power source provided outside the vehicle 100 as a unit separate from the vehicle 100. For example, a commercial power source is used as the external power source.

The power-receiving portion 71 receives the electric power supplied from a power-transmitting portion 72. The power-receiving portion 71 and the power-transmitting portion 72 are placed apart in a non-contact state. An exemplary method of supplying the electric power from the power-transmitting portion 72 to the power-receiving portion 71 is a power-transmitting method using electromagnetic induction or a resonance phenomenon. Since the power-transmitting method is known, detailed description thereof is omitted. The power-transmitting portion 72 is placed on the ground 200 and is connected to the external power source.

The power-receiving portion 71 supplies the electric power received from the power-transmitting portion 72 to the high-capacity assembled battery 20. While the power-receiving portion 71 supplies the electric power to the high-capacity assembled battery 20 in the present embodiment, the power-receiving portion 71 may supply the electric power to the high-power assembled battery 10. For example, when the high-power assembled battery 10 is excessively discharged, the high-power assembled battery 10 can be charged with the electric power received by the power-receiving portion 71.

Since the high-capacity assembled battery 20 (battery pack 20A) is placed in the vehicle-outside space OS, the power-receiving portion 71 can be attached to the battery pack 20A as shown in FIG. 12. Even when the power-receiving portion 71 is not attached to the battery pack 20A, the power-receiving portion 71 can be placed at a position adjacent to the battery pack 20A. Since the power-receiving portion 71 and the battery pack 20A can be placed together, the electric power received by the power-receiving portion 71 is easily supplied to the battery pack 20A (high-capacity assembled battery 20). In other words, the path for supplying the electric power from the power-receiving portion 71 to the high-capacity assembled battery 20 can be shortened.

While the charge system of the non-contact type is used in the present embodiment, the present invention is not limited thereto. Specifically, the electric power of the external power source can be supplied to the vehicle 100 (mainly to the high-capacity assembled battery 20) by connecting a charge connector connected to the external power source through a cable to a charge inlet provided for the vehicle 100.

The placement of the battery pack 20A in the vehicle-outside space OS allows an operator to access the battery pack 20A easily. For example, the vehicle 100 is lifted up so that the operator can easily access the battery pack 20A attached to the floor panel 101. This can facilitate the replacement, inspection and the like of the battery pack 20A.

The replacement of the battery pack 20A can be performed manually by the operator or can be performed automatically by using a robot system. For example, a hook mechanism can be used as a structure for mounting the battery pack 20A on the vehicle 100 to perform easy mounting or removal of the battery pack 20A. Specifically, a hook is provided for one of the vehicle 100 and the battery pack 20A, and the other of the vehicle 100 and the battery pack 20A is hung on the hook to enable the mounting of the battery pack 20A on the vehicle 100. The battery pack 20A can be removed from the vehicle 100 by undoing the hook.

When the EV running mode has a higher priority than the HV running mode in running the vehicle 100, the frequency of use of the high-capacity assembled battery 20 is higher than that of the high-power assembled battery 10. When the EV running mode has a higher priority than the HV running mode, for example, the vehicle 100 is run in the EV running mode immediately after the starting, and the EV running mode can be switched to the HV running mode when the running in the EV running mode cannot be performed. The higher frequency of use of the high-capacity assembled battery 20 may readily deteriorate the high-capacity assembled battery 20 due to charge and discharge. In addition, since the high-capacity assembled battery 20 has the higher temperature dependence than the high-power assembled battery 10 as described with reference to FIG. 9, the high-capacity assembled battery 20 may be deteriorated more easily than the high-power assembled battery 10 in response to a temperature change.

Once the high-capacity assembled battery 20 is deteriorated, at least part of the high-capacity assembled battery 20 needs replacement. For changing the capacity of the high-capacity assembled battery 20 in order to change the running distance in the EV running mode, the high-capacity assembled battery 20 also needs replacement. For example, to increase the running distance in the EV running mode, the number of the cells 22 (battery blocks 21) constituting the high-capacity assembled battery 20 can be increased. In this manner, the high-capacity assembled battery 20 is replaced at a higher frequency than that of the high-power assembled battery 10. The high-capacity assembled battery 20 is placed at the position where it can be replaced easily as in the present embodiment, which can reduce the inconvenience in replacing the high-capacity assembled battery 20.

The placement of the battery pack 20A in the vehicle-outside space OS allows easy release of heat produced in the battery pack 20A into the atmosphere. The high-capacity assembled battery 20 is charged with the electric power supplied from the external power source, and the vehicle 100 is parked during the charge of the high-capacity assembled battery 20. When the blower used for adjusting the temperature of the high-capacity assembled battery 20 is not driven, the charge of the high-capacity assembled battery 20 causes the high-capacity assembled battery 20 to produce heat, and the heat stays in the battery pack 20A. The battery pack 20A is placed in the vehicle-outside space OS in the present embodiment, and even when the high-capacity assembled battery 20 produces heat due to the charge using the external power source, the heat of the battery pack 20A is easily released into the atmosphere.

The attachment of the battery pack 20A to a lower face of the floor panel 101 can lower the barycenter of the vehicle 100. To ensure the running distance in the EV running mode, the many cells 22 constituting the high-capacity assembled battery 20 need to be prepared, and the high-capacity assembled battery 20 tends to be heavier than the high-power assembled battery 10. Thus, the high-capacity assembled battery 20 can be attached to the lower face of the floor panel 101 to lower the barycenter of the vehicle 100, and the lowered barycenter of the vehicle 100 can suppress a roll of the vehicle 100 to improve the drivability.

To ensure the running distance in the EV running mode, the high-capacity assembled battery 20 tends to be larger than the high-power assembled battery 10. In the vehicle-inside space IS, seats and the like are placed, and the space for placing the high-capacity assembled battery 20 may be difficult to provide. If the high-capacity assembled battery 20 is attempted to be placed in the luggage space serving as the vehicle-inside space IS, the space for placing baggage may be extremely narrowed.

On the other hand, somewhat wide space is readily ensured for the vehicle-outside space OS, and the space for placing the high-capacity assembled battery 20 is easily ensured. When the battery pack 20A (high-capacity assembled battery 20) is placed on the floor panel 101 as in the present embodiment, the overall face of the floor panel 101 can be used to place the battery pack 20A, which facilitates the placement of the battery pack 20A. For changing the capacity (in other words, the size) of the high-capacity assembled battery 20 in response to the need of a user, the placement of the high-capacity assembled battery 20 in the vehicle-outside space OS can readily satisfy the need for the change in size of the high-capacity assembled battery 20.

As described above, the size of the cylinder-type cell 22 is smaller than the size of the square-type cell 11. For this reason, the layout of the cylinder-type cell 22 is set more freely than the square-type cell 11. Specifically, the orientation of the cell 22 is easily changed when it is mounted on the vehicle 100. Even when the battery pack 20A is attached to the lower face of the floor panel 101, the layout (orientation) of the cell 22 can be set as appropriate to ensure the distance from the ground to the battery pack 20A.

In the present embodiment, the high-power assembled battery 10 and the high-capacity assembled battery 20 are placed individually in the vehicle-inside space IS and the vehicle-outside space OS, respectively. In other words, the high-power assembled battery 10 and the high-capacity assembled battery 20 are placed in different environments. When one of the two environments is changed, and charge and discharge are inhibited in the assembled battery (assembled battery 10 or assembled battery 20) placed in the changed environment, the other assembled battery (assembled battery 20 or assembled battery 10) can be used continuously. In addition, the continuously used assembled battery can be used to start the engine 34.

For allowing the charge and discharge of the assembled batteries 10 and 20, it is necessary to operate the system main relays SMR-B1 and B2, and SMR-G1 and G2 provided for the assembled batteries 10 and 20, respectively. In the system main relay, a current is passed through a coil to produce a magnetic force which is then used to turn the switch from OFF to ON. Thus, an abnormal sound may occur in turning the system main relay from OFF to ON.

The high-capacity assembled battery 20 (battery pack 20A) is placed in the vehicle-outside space OS, and even when the abnormal sound occurs in turning the system main relays SMR-B2 and G2 of the high-capacity assembled battery 20 from OFF to ON, the abnormal sound can hardly reach the passenger in the vehicle-inside space IS. Furthermore, the placement of the high-capacity assembled battery 20 in the vehicle-outside space OS can prevent noise produced in the temperature adjustment of the high-capacity assembled battery 20 reaching the passenger. Examples of the noise produced in the temperature adjustment include noise when the blower is driven, noise occurring due to flow of air supplied to the assembled battery 20 and the like.

As described above, the high-capacity assembled battery 20 can be used mainly in the EV running mode. Since the engine 34 is not operated in the EV running mode, silence is required more than in the HV running mode. Since the abnormal sound or the noise hardly reaches the passenger during the use of the high-capacity assembled battery 20 in the present embodiment, the silence can be ensured.

In charging and discharging the assembled batteries 10 and 20, electromagnetic waves are produced from the assembled batteries 10 and 20. The placement of the high-capacity assembled battery 20 in the vehicle-outside space OS can suppress the entrance of the electromagnetic waves produced in the high-capacity assembled battery 20 into the vehicle-inside space IS. Specifically, the vehicle body (especially, the floor panel 101) to which the battery pack 20A (high-capacity assembled battery 20) is attached prevents the electromagnetic waves produced in the high-capacity assembled battery 20 from entering the vehicle-inside space IS.

When the EV running mode has the higher priority than the HV running mode, the frequency of use of the high-capacity assembled battery 20 is higher than that of the high-power assembled battery 10 as described above. In this case, the electromagnetic waves are readily produced from the high-capacity assembled battery 20. The placement of the high-capacity assembled battery 20 in the vehicle-outside space OS can significantly reduce the electromagnetic waves reaching the vehicle-inside space IS. When a radio or a television is used in the vehicle 100, the electromagnetic waves easily produce noise. The reduced electromagnetic waves can suppress the production of noise.

As descried above, the output density of the cell 11 used in the high-power assembled battery 10 is higher than the output density of the cell 22 used in the high-capacity assembled battery 20. Thus, the value of a current passing through the cell 11 during charge and discharge of the high-power assembled battery 10 is higher than the value of a current passing through the cell 22. Since the amount of heat production is proportional to the square of the value of the current, the amount of heat production is significantly increased as the value of the current is increased. As a result, the high-power assembled battery 10 has the characteristic of producing more heat than the high-capacity assembled battery 20, and preferably, the high-power assembled battery 10 is cooled more preferentially than the high-capacity assembled battery 20.

Since the high-power assembled battery 10 is placed in the vehicle-inside space IS in the present embodiment, the air in the vehicle-inside space IS can be used to suppress a rise in temperature in the high-power assembled battery 10 efficiently. The temperature of the vehicle-inside space IS is often adjusted to a temperature suitable for the temperature adjustment of the high-power assembled battery 10 through the use of an air-conditioner installed on the vehicle 100 or the like. While the use of the air-conditioner easily adjusts the temperature of the vehicle-inside space IS, the adjustment of the temperature of the vehicle-inside space IS can be performed, for example by opening a window for ventilation, without using the air-conditioner. The air in the vehicle-inside space IS can be supplied to the high-power assembled battery 10 to facilitate the temperature adjustment of the high-power assembled battery 10.

The invention claimed is:

1. A vehicle comprising:
a motor and an engine each serving as a driving source for running the vehicle; and
a high-power assembled battery and a high-capacity assembled battery each capable of supplying an electric power to the motor, the high-power assembled battery and the high-capacity assembled battery constituted by secondary batteries, respectively,
the high-power assembled battery being capable of charge and discharge with a current relatively larger than that in the high-capacity assembled battery,
the high-capacity assembled battery having an energy capacity relatively larger than that of the high-power assembled battery,
in running of the vehicle using an output from the motor with the engine stopped, the high-capacity assembled battery supplying a more electric power to the motor than that in the high-power assembled battery,
wherein the high-power assembled battery is placed in a vehicle-inside space accommodating a passenger or baggage, and
the high-capacity assembled battery is placed in a vehicle-outside space located on an outer face of a vehicle body.

2. The vehicle according to claim 1, wherein, in running of the vehicle using the output from the motor with the engine stopped, a frequency of use of the high-capacity assembled battery is higher than a frequency of use of the high-power assembled battery.

3. The vehicle according to claim 1, wherein, in running of the vehicle using the output from the motor with the engine stopped, a proportion of the electric power supplied from the high-capacity assembled battery to the motor in the electric power supplied to the motor is higher than a proportion of the electric power supplied from the high-power assembled battery to the motor.

4. The vehicle according to claim 1, wherein the high-capacity assembled battery is replaced at a frequency higher than that of the high-power assembled battery.

5. The vehicle according to claim 1, further comprising a power-receiving portion receiving an electric power for use in charging the high-capacity assembled battery from a power-transmitting portion placed outside the vehicle, the power-receiving portion being placed at a position adjacent to the high-capacity assembled battery.

6. The vehicle according to claim 1, wherein the high-capacity assembled battery has a size larger than that of the high-power assembled battery.

7. The vehicle according to claim 1, wherein the high-capacity assembled battery has a weight heavier than that of the high-power assembled battery, and
the high-capacity assembled battery is attached to a surface of a floor panel, the surface facing outside the vehicle.

8. The vehicle according to claim 1, wherein the high-power assembled battery has a plurality of cells connected in series, and
the high-capacity assembled battery has a plurality of cells connected in parallel.

9. The vehicle according to claim 8, wherein the cell of the high-power assembled battery is a square-type cell, and
the cell of the high-capacity assembled battery is a cylinder-type cell.

\* \* \* \* \*